United States Patent
Zug

(10) Patent No.: US 11,511,865 B2
(45) Date of Patent: Nov. 29, 2022

(54) AIR SUPPLY MANAGEMENT SYSTEM FOR AUXILIARY POWER UNIT

(71) Applicant: Honeywell International Inc., Morris Plains, NJ (US)

(72) Inventor: Andrew Zug, Costa Mesa, CA (US)

(73) Assignee: Honeywell International Inc., Charlotte, NC (US)

( * ) Notice: Subject to any disclaimer, the term of this patent is extended or adjusted under 35 U.S.C. 154(b) by 823 days.

(21) Appl. No.: 16/407,078

(22) Filed: May 8, 2019

(65) Prior Publication Data

US 2019/0367173 A1    Dec. 5, 2019

Related U.S. Application Data

(60) Provisional application No. 62/677,507, filed on May 29, 2018.

(51) Int. Cl.
*B64D 13/06*    (2006.01)

(52) U.S. Cl.
CPC ...... *B64D 13/06* (2013.01); *B64D 2013/0611* (2013.01)

(58) Field of Classification Search
CPC ............ B64D 13/02; B64D 2013/0611; B64D 2041/002
See application file for complete search history.

(56) References Cited

U.S. PATENT DOCUMENTS

| | | |
|---|---|---|
| 2,284,984 A | 6/1942 | Nixon et al. |
| 4,642,997 A | 2/1987 | Krafka |
| 5,956,960 A * | 9/1999 | Niggeman ............ B64D 41/00 60/785 |
| 6,283,410 B1 | 9/2001 | Thompson |
| 6,581,874 B2 | 6/2003 | Lemire et al. |
| 2014/0083647 A1 | 3/2014 | Army, Jr. et al. |
| 2015/0034771 A1 | 2/2015 | Joubert et al. |
| 2015/0089921 A1 | 4/2015 | Rideau et al. |
| 2015/0367952 A1 | 12/2015 | Rideau et al. |
| 2016/0009409 A1 | 1/2016 | Rideau |
| 2016/0214725 A1 | 7/2016 | Holtrup et al. |

(Continued)

FOREIGN PATENT DOCUMENTS

| | | |
|---|---|---|
| EP | 1222110 B1 | 1/2003 |
| EP | 3127816 A1 | 2/2017 |

(Continued)

OTHER PUBLICATIONS

Extended Search Report from counterpart European Application No. 19176616.1, dated Aug. 22, 2019, 11 pp.

(Continued)

*Primary Examiner* — Timothy D Collins
*Assistant Examiner* — Eric Acosta
(74) *Attorney, Agent, or Firm* — Shumaker & Sieffert, P.A.

(57) ABSTRACT

The disclosure describes a system that includes an auxiliary power unit (APU), an APU throttle valve, and an environmental control system (ECS) bypass valve. The APU is configured to receive cabin discharge air from an aircraft cabin and receive ECS supply air from an air pressurization system (APS). The APU throttle valve is configured to control flow of cabin discharge air from the cabin to the APU. The ECS bypass valve configured to control flow of ECS supply air from the APS to the APU.

20 Claims, 6 Drawing Sheets

(56) References Cited

U.S. PATENT DOCUMENTS

| | | |
|---|---|---|
| 2016/0281608 A1 | 9/2016 | Haillot |
| 2016/0304209 A1 | 10/2016 | Zug |
| 2016/0305683 A1 | 10/2016 | Zug |
| 2016/0311541 A1 | 10/2016 | Morishita et al. |
| 2017/0036768 A1 | 2/2017 | Stieger et al. |
| 2018/0134396 A1 | 5/2018 | Blumer et al. |
| 2019/0283884 A1 | 9/2019 | Horner et al. |
| 2019/0287321 A1 | 9/2019 | Horner et al. |

FOREIGN PATENT DOCUMENTS

| | | |
|---|---|---|
| WO | 99/12810 A1 | 3/1999 |
| WO | 2011/056285 A1 | 5/2011 |
| WO | 2012/076373 A2 | 6/2012 |
| WO | 2014118455 A1 | 8/2014 |

OTHER PUBLICATIONS

Response to Extended Search Report dated Aug. 22, 2019, from counterpart European Application No. 19176616.1, dated Apr. 8, 2020, 48 pp.

Notice of Intent to Grant and Text Intended to Grant from counterpart European Application No. 19176616.1, dated Jul. 31, 2020, 37 pp.

* cited by examiner

AIR SUPPLY MANAGEMENT SYSTEM FOR AUXILIARY POWER UNIT

RELATED APPLICATION DATA

This application claims priority to U.S. Provisional application No. 62/677,507, entitled "AIR SUPPLY MANAGEMENT SYSTEM FOR AUXILIARY POWER UNIT," filed on May 29, 2018, which is incorporated herein by reference in its entirety.

TECHNICAL FIELD

The present disclosure relates to systems and techniques for supplying air to auxiliary power units of aircraft.

BACKGROUND

An auxiliary power unit (APU) of an aircraft may provide power to non-propulsive components of the aircraft, such as electric, pneumatic, and/or hydraulic power. The power capability of the APU may be related to an amount and/or quality of pressurized air supplied to the APU. To maintain a given power load supplied by the APU, the supply air to the APU (also referred to as the "APU core flow demand") may be maintained above a particular pressure and/or a particular flow rate.

In aircraft, one source of pressurized air for the APU is the cabin. To maintain personal comfort, pressurized air may be supplied to the cabin at a particular rate and discharged from the cabin. Rather than ejecting the cabin air to the atmosphere, air discharged from the cabin may be fed to the APU. When the APU core flow demand is less than the supply of cabin discharge air, the cabin discharge air may supply all the air for the APU core flow demand. However, if the APU core flow demand exceeds the available supply of cabin discharge air, the APU inlet flow must be throttled, which reduces the APU core flow demand and reduces the power capability of the APU. For large enough shortfalls in supply of cabin discharge air relative to APU core flow demand, the pressure at the APU inlet must be throttled to below ambient pressure, allowing outside air to flow in through a check valve to the atmosphere and eliminating any benefit to the APU of the elevated cabin pressure.

SUMMARY

In some examples, the disclosure describes a system that includes an auxiliary power unit (APU), an APU throttle valve, and an environmental control system (ECS) bypass valve. The APU is configured to receive cabin discharge air from an aircraft cabin and receive ECS supply air from an air pressurization system (APS). The APU throttle valve is configured to control flow of cabin discharge air from the cabin to the APU. The ECS bypass valve configured to control flow of ECS supply air from the APS to the APU.

In some examples, the disclosure describes a method by a controller that includes receiving a valve position measurement from at least one of an outflow valve or an auxiliary power unit (APU) throttle valve, in which the outflow valve is configured to control flow of cabin discharge air from a cabin to an environment and the APU throttle valve is configured to control flow of cabin discharge air from the cabin to an APU. The method further includes receiving at least one of an outflow valve setpoint or an APU throttle valve setpoint, in which the outflow valve setpoint represents a predetermined flow of cabin discharge air and the APU throttle valve setpoint represents a predetermined flow of cabin discharge air from the cabin to the APU. The method further includes determining a difference between the valve position measurement and the corresponding valve setpoint and determining, based on the difference between the valve position measurement and the corresponding valve setpoint, a control signal for at least one environmental control system (ECS) bypass valve, in which the at least one ECS bypass valve is configured to control flow of ECS supply air from an air pressurization system (APS) to the APU. The method further includes outputting the control signal to the at least one ECS bypass valve.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
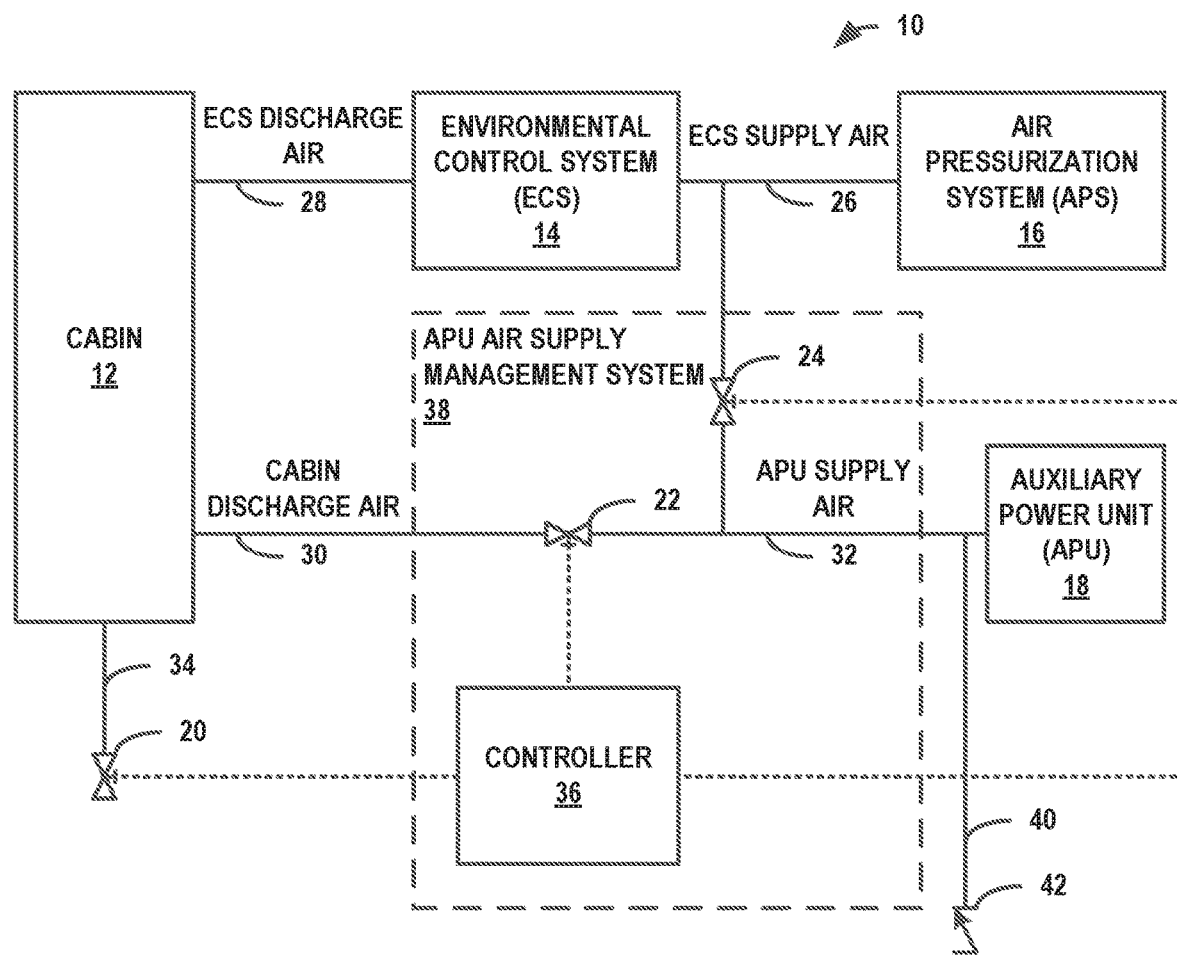
FIG. 1 is a diagram illustrating an example system for managing pressurized air supplies to an auxiliary power unit (APU).

A cabin of an aircraft may receive pressurized air from an environmental control system (ECS) and discharge a portion of the pressurized air as cabin discharge air to an auxiliary power unit (APU). The portion of the pressurized air available as cabin discharge air may be equal to fresh air flow from the ECS discounted for uncontrolled leakage from the cabin, such as through seams in the cabin, and controlled discharge from the cabin for cabin ventilation and pressure control functions, such as through cabin air extraction systems and outflow valves. The fresh air flow from the ECS may be proportional to a size of the ECS and may remain relatively static during various operations. As an example, a typical fresh air flow requirement for an Airbus A320 or a Boeing 737 size aircraft is approximately 2.2 lb/s. An air cycle ECS may typically flow more than this flow requirement at max-cooling conditions (e.g., on ground) due to a limit on how cold a refrigeration pack discharge temperature of the air cycle ECS can get, but may operate at or near the limit at high altitude to minimize energy demand. A vapor cycle ECS may be designed to only flow this much fresh air, regardless of heat load. If extra cooling is needed in a vapor cycle ECS, more recirculation flow may be used, as it may be easier to increase and cool recirculation air than fresh air. However, during various aircraft operations such as ascent and descent, an amount of uncontrolled leakage and/or controlled discharge make change significantly. For example, leakage flow may peak at mid-altitudes when flow reaches sonic pressure ratios, then decrease as cabin altitude increases. As another example, during descent, an aircraft cabin may gain approximately 270 lb of air within the pressurized volume. These fluctuations in pressurized cabin air demand may reduce an amount of cabin discharge air available for supply to the APU.

For a typical commercial transport aircraft, the flow demand for a state of the art APU may exceed the available flow throughout much of a typical aircraft flight, even at relatively modest APU power loads. When these flow shortfalls arise, an APU configured for cabin discharge air may drop out of cabin discharge air mode or increase the overall aircraft fresh air flow to generate enough pressurized air to make up for the APU flow demand. Increasing the fresh air flow may impose a significant penalty due to the increased size, weight, cost, and drag of an ECS sized for the increased fresh air flow. Increasing the fresh air flow may also interfere with normal Air Management System control schemes for managing ventilation flow rates for passenger comfort, such as by operating an oversized ECS for the cabin.

According to principles of the disclosure, a system for supplying air to an auxiliary power unit (APU) may supplement the cabin discharge air from the cabin with other pressurized air upstream of the cabin. The APU receives cabin discharge air from an aircraft cabin and, if the supply of cabin discharge air is not adequate to meet the APU air supply demand, supplements the cabin discharge air with environmental control system (ECS) supply air from the ECS or an air pressurization system (APS). The ECS supply air may be at a pressure greater than the pressure of the cabin discharge air to make up for pressure losses through the ECS. An APU throttle valve controls flow of cabin discharge air from the cabin to the APU, while an ECS bypass valve controls flow of ECS supply air from the APS and/or ECS to the APU.

In this way, the APU may operate a greater amount of time with supply air at or above cabin discharge air pressure; in some instances, the APU may continue to receive pressurized air during end-of-life cabin leakages, flow transients, and dispatch-allowable failure conditions (such as a loss of a single ECS pack.) In one example, an ECS may draw a reduced amount of bleed air or electrical power from the main engines of the aircraft. As another example, the APU may be capable of providing full aircraft electrical power even at maximum aircraft altitudes.

FIG. 1 is a diagram illustrating an example system 10 for managing pressurized air supply to an auxiliary power unit (APU). System 10 includes a cabin 12, an environmental control system (ECS) 14, an air pressurization system (APS) 16, an auxiliary power unit (APU) 18, and an APU air supply management system 38. APU air supply management system 38 includes an APU throttle valve 22, an ECS bypass valve 24, and a controller 36.

Cabin 12 is a compartment of an aircraft that includes an internal environment. For example, cabin 12 may be configured to house people, cargo, and the like, in the internal environment. Cabin 12 may be fluidically coupled to ECS 14 through ECS discharge line 28. To maintain adequate conditions within the internal environment of cabin 12, such as for personal comfort or required by law or industry standard, ECS 14 may be configured to control ambient conditions of cabin 12. For example, ECS 14 may be configured to control a pressure, temperature, humidity, air flow rate, or other ambient conditions of cabin 12 at various aircraft conditions, such as ground operation, passenger loading, take-off, cruising, descent, and landing. ECS 14 may be configured to generate ECS discharge air from ECS supply air according to one or more setpoints for ambient conditions of cabin 12. For example, ECS 14 may generate ECS discharge air to maintain a target range of pressures, temperatures, and/or humidity of cabin 12. ECS 14 may be fluidically coupled to APS 16 through ECS supply line 26 and configured to receive ECS supply air from APS 16 through ECS supply line 26. ECS 14 may be configured to output ECS discharge air to cabin 12 through ECS discharge line 28.

In some examples, system 10 includes at least one outflow valve 20 on an outflow discharge line 34 configured to maintain a pressure of cabin 12 by controlling flow of cabin discharge air from cabin 12 to an external environment. For example, ECS 14 may supply pressurized ECS discharge air to cabin 12, while outflow valve 20 may relieve pressure from cabin 12, such as by discharging air from outflow discharge line 34 through outflow valve 20. In some examples, as will be described further below, outflow valve 20 may be communicatively coupled to controller 36, such that outflow valve 20 may receive control signals from controller 36.

A variety of environmental control systems may be used for ECS 14 including, but not limited to, a vapor cycle cooling system and an air cycle cooling system. In some examples, ECS 14 includes an air cycle ECS. For example, an air cycle ECS may avoid the use of refrigerants by using air as a refrigeration medium. To maintain a pressure of the ECS discharge air to cabin 12, ECS supply air to the air cycle ECS may be relatively high (e.g., between 10-20 psig). In some examples, ECS 14 includes a vapor cycle cooling system that utilize a vapor cycle pack. For example, a vapor cycle ECS may operate at lower ECS supply air pressures (e.g., between 1-5 psig).

Figure 2:
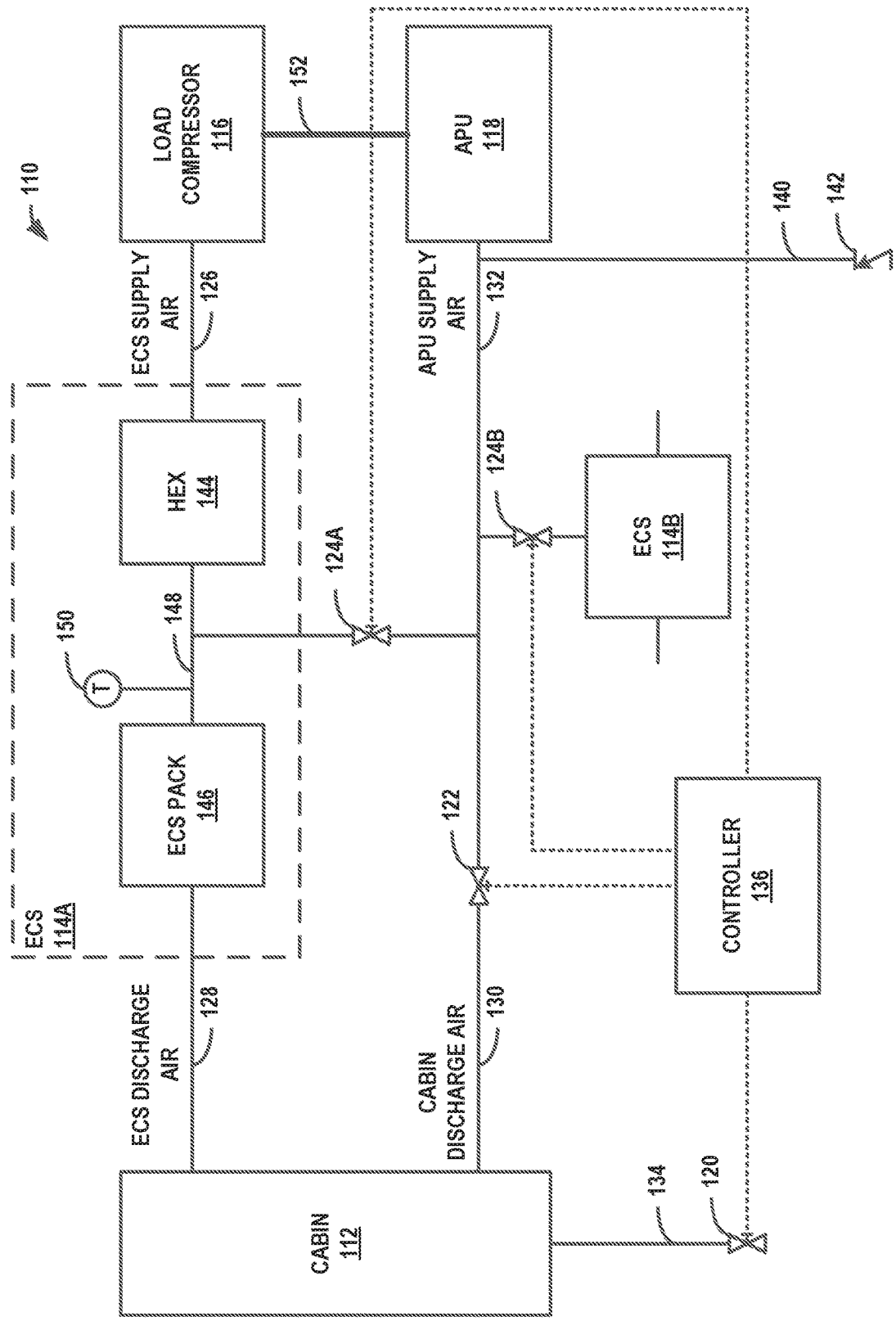
FIG. 2 is a diagram illustrating an example system for managing pressurized air supplies to an auxiliary power unit (APU) that includes one or more ECS bypass valves downstream of one or more heat exchangers.
Figure 3:
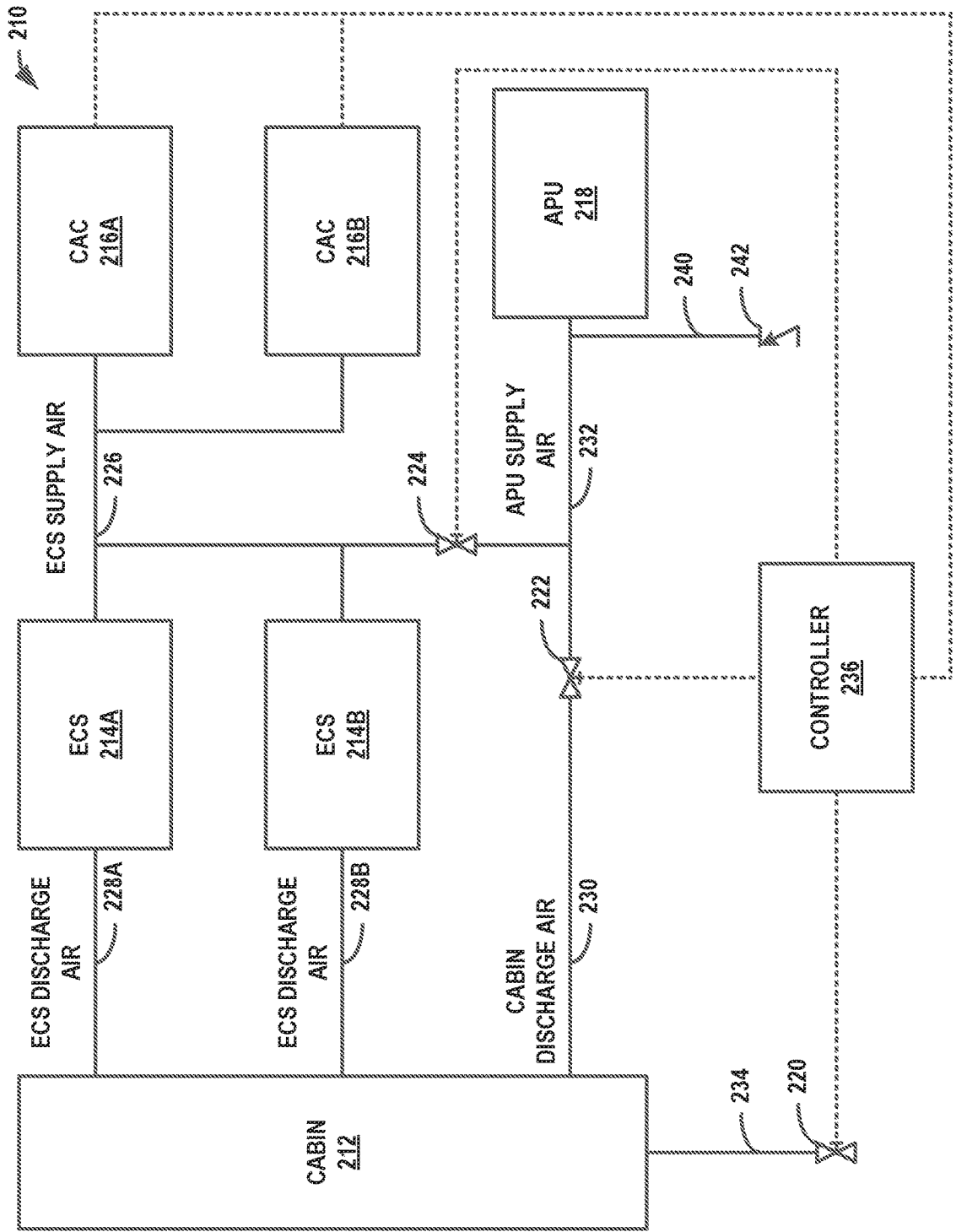
FIG. 3 is a diagram illustrating an example system for managing pressurized air supplies to an auxiliary power unit (APU) that includes one or more cabin air compressors to supply the APU with pressurized ECS supply air.
Figure 4:
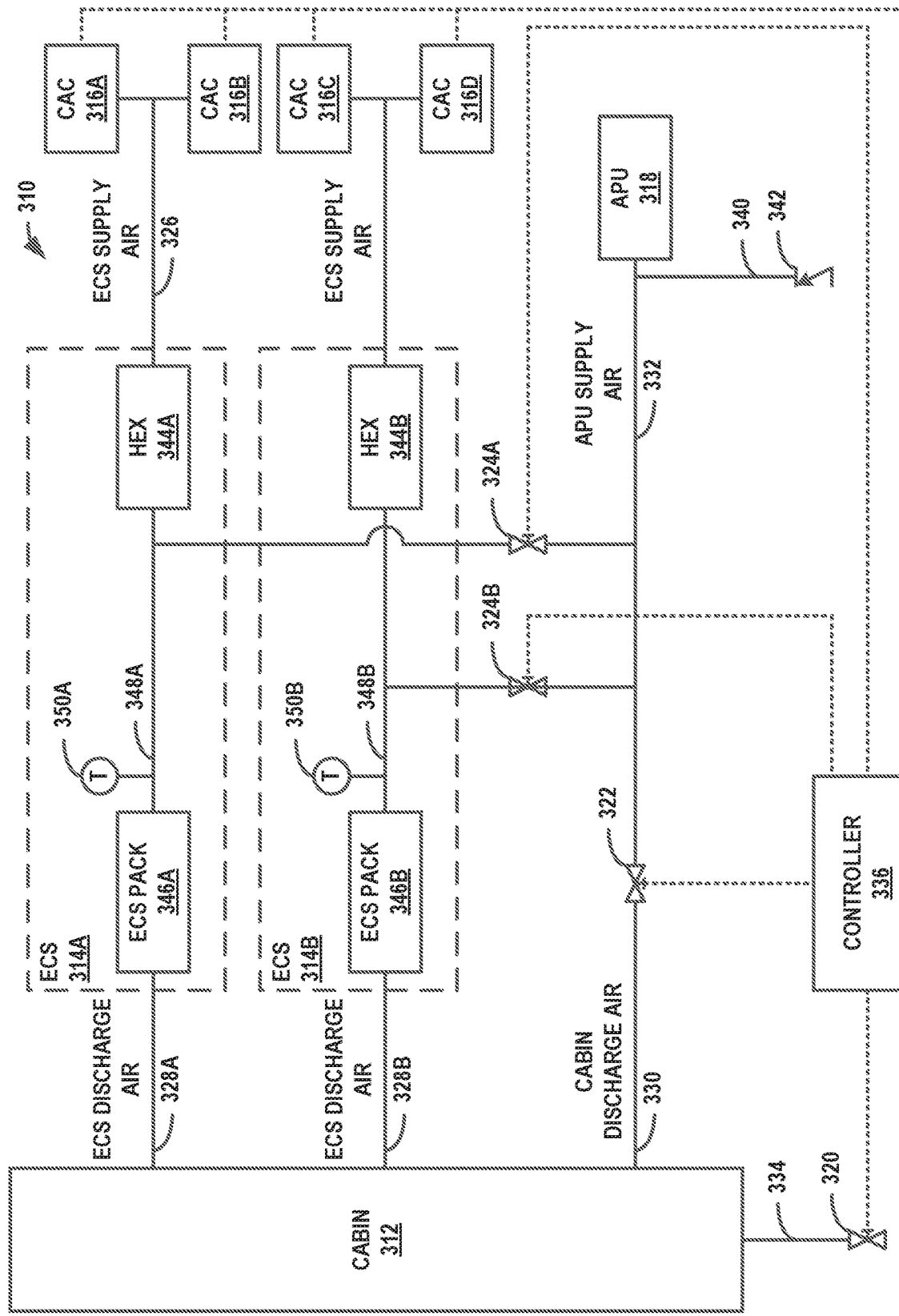
FIG. 4 is a diagram illustrating an example system for managing pressurized air supplies to an auxiliary power unit (APU) that includes redundant and independently operable pressurization components.

Air pressurization system (APS) 16 is configured to supply pressurized air to ECS 14. For example, when an aircraft is on the ground, air pressure outside the aircraft may be similar to or the same as air pressure within cabin 12. However, once the air is at higher elevations, the air pressure outside the aircraft may be significantly lower than an air pressure required for cabin 12, such that APS 16 may supply ECS 14 with pressurized ECS supply air for use in cabin 12. APS 16 may include a variety of air pressurization systems and sources such as a bleed air source (e.g., a main turbine engine), a load compressor (e.g., a load compressor coupled to APU 18, as shown in FIG. 2), or a stand-alone air pressurization system such as cabin air compressors (e.g., as shown in FIGS. 3 and 4), and the like. In some examples, APS 16 may be configured to receive environmental air, such as ram air flow or bleed air, generate ECS supply air from the environmental air, and output the ECS supply air to ECS 14. As mentioned above, the ECS supply air from APS 16 may be pressurized to different pressures according to a type of ECS 14. For example, a vapor cycle ECS may use lower pressure air for a vapor cycle pack than an air cycle ECS, such that APS 16 may expend more energy pressurizing air for an air cycle ECS than a vapor cycle ECS.

APU 18 provides power to non-propulsive components of the aircraft, such as electric, pneumatic, and/or hydraulic power. APU 18 is configured to receive cabin discharge air from cabin 12 through APU throttle valve 22 and APU supply line 32 to support combustion of fuel in APU 18. For example, the cabin discharge air may be at an elevated pressure compared to air outside the aircraft, such that a compressor of APU 18 may not use as much energy to compress the cabin discharge air to an adequate pressure. APU supply line 32 may also include an APU outboard line 40 coupled to an outboard check valve 42 and configured to allow air flow to APU 18, such as in emergency conditions in which cabin discharge air is not available.

APU throttle valve 22 is configured to control flow of cabin discharge air from cabin 12 to APU 18. At full flow of cabin discharge air through APU throttle valve 22, cabin discharge air may be at an elevated pressure, such as about 14 psia. As will be described further below, APU throttle valve 22 may be communicatively coupled to controller 36, such that APU throttle valve 22 may receive control signals from controller 36.

In addition to cabin discharge air, APU 18 is configured to receive ECS supply air from APS 16. As discussed above, cabin discharge air from cabin 12 may not adequately supply APU 18 with APU supply air, such that performance and/or life of APU 18 may suffer. To supplement shortfalls in cabin discharge air from cabin 12, system 10 includes APU air supply management system 38 configured to supply APU 18 with adequate pressurized air from sources other than cabin 12. This "ECS bypass air" may allow APU 18 to have sufficient APU supply air for meeting full power demands without unduly affecting the size of ECS 14 or interfering with Air Management System functions.

ECS bypass valve 24 is configured to control flow of ECS supply air from APS 16 to APU 18. ECS bypass valve 24 is communicatively coupled to ECS supply line 26 and APU supply line 32. In some examples, such as where ECS 14 is an air cycle ECS, ECS supply air may be at a significantly higher pressure than cabin discharge air, such that ECS bypass valve 24 may reduce a pressure of ECS supply air from ECS supply line 26. In some examples, such as where ECS 14 is a vapor cycle ECS, ECS supply air may be at a relatively low pressure compared to air cycle ECS, such that ECS bypass valve 24 may reduce a pressure of ECS supply air to a lesser extent than air cycle ECS.

In the example of FIG. 1, ECS bypass valve 24 is coupled to ECS supply line 26 upstream of ECS 14. By drawing ECS supply air from upstream of ECS 14, system 10 may avoid or minimize a size and ram penalty of flowing more ECS supply air through ECS 14, such as if ECS discharge air supply were increased to cabin 12 to increase the cabin discharge air available to APU 18. For example, extra pressurized ECS supply air may be provided to APU 18 from APS 16, but a supply of ECS supply air to ECS 14 may be relatively unchanged. While ECS bypass valve 24 is shown as coupling to ECS supply line between APS 16 and ECS 14, ECS bypass valve 24 may receive ECS supply air from a variety of locations upstream of an outlet of ECS 14. For example, as will be explained further in FIG. 2 below, ECS 14 may include a primary heat exchanger at an inlet of ECS 14, such that ECS bypass valve 24 may be fluidically coupled to an outlet of the primary heat exchanger.

Controller 36 may be configured to monitor and/or operate one or more process control components of system 10. For example, controller 36 may be communicatively coupled to any of APU throttle valve 22, ECS bypass valve 24, and outflow valve 20, and configured to send control signals to any of APU throttle valve 22, ECS bypass valve 24, and outflow valve 20. Controller 36 may also be communicatively coupled to instrumentation, such as flow meters, temperature sensors, and pressure sensors, and configured to receive measurement signals from the instrumentation. Controller 36 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, and the like.

In some examples, controller 36 may be configured to control a pressure of cabin 12 using at least one of APU throttle valve 22 and outflow valve 20. Controller 36 may control APU throttle valve 22 in coordination with outflow valve 20 to control a pressure of cabin 12. Controller 36 may prioritize keeping the APU throttle valve 22 fully open and control cabin pressure through modulation of outflow valve 20. For example, when an APU supply air demand is less than a cabin discharge air flow, controller 36 may control outflow valve 20 to maintain the pressure of cabin 12 within a range of a pressure setpoint. However, in some instances, controller 36 may control cabin pressure through modulation of APU throttle valve 22. For example, when an APU supply air demand is greater than a cabin discharge air flow, controller 36 may be configured to fully close outflow valve 20 and control a pressure of cabin 12 by controlling APU throttle valve 22.

In some examples, controller 36 may be configured to control a flow of APU supply air to APU 18 using at least one of APU throttle valve 22 and ECS bypass valve 24. For example, controller 36 may be configured to control a flow rate of ECS bypass valve 24 based at least on a flow rate of APU throttle valve 22. As discussed above, controller 36 may control a pressure of cabin 12 by controlling APU throttle valve 22, which may cause a reduction in flow of cabin discharge air to APU 18. In such instances, controller 36 may control ECS bypass valve 24 to compensate for a reduced flow of cabin discharge air from cabin 12 by discharging ECS supply air to APU supply line 32. For example, controller 36 may receive an APU supply air demand from APU 18 and an indication of flow rate of cabin discharge air, such as from a flow meter coupled to cabin discharge line 30 or other instrumentation that may indicate a flow of cabin discharge air. Controller 36 may determine a shortfall in flow from the difference between the APU supply air demand and the flow rate of cabin discharge air and output a control signal to ECS bypass valve 24 to discharge an amount of ECS supply air to APU supply line 32 to meet the APU supply air demand.

In some examples, controller 36 may be configured to control ECS bypass valve 24 based on valve position of outflow valve 20 and/or APU throttle valve 22. As discussed above, a fully closed outflow valve 20 and/or modulating APU throttle valve 22 may indicate that an outflow of cabin discharge air through APU throttle valve 22 is not adequate for the APU supply air demand. For example, controller 36 may receive a valve position measurement signal from outflow valve 20 and/or APU throttle valve 22 and control ECS bypass valve 24 based on the position of outflow valve 20 and/or APU throttle valve 22, thereby anticipating a potential modulation or responding to a current modulation of APU throttle valve 22. As a result, controller 36 maintains APU inlet pressure, which may reduce APU turbine inlet temperature to increase fuel efficiency and APU life.

By supplementing cabin discharge air with ECS supply air, system 10 may operate more efficiently. For example, for an APS that includes bleed air, an incremental APU shaft power from 1 lb/min extra core flow may be greater than an incremental cost of providing 1 lb/min of bleed air to compensate for a lower cabin discharge air supply. In examples where ECS 14 is an air cycle ECS, a benefit of an increase in APU shaft power may be relatively modest due to a relatively large amount of energy used by APS 16 to generate the high pressure ECS supply air for the air cycle ECS. However, in examples where ECS 14 is a vapor cycle ECS, which may use ECS supply air that is a lower pressure relative to cabin pressure than the air cycle ECS, a benefit of an increase in APU shaft power may be more pronounced. For example, at about 40,000 feet elevation and after accounting for pressurization air energy cost, an air cycle ECS may have a net power gain of about 1-1.5 kW per lb/min, while a vapor cycle ECS may have a net power gain of about 1.5-3 kW per lb/min. This positive marginal power can also be used on the ground to increase the maximum output power of the APU 18 beyond normal limits (for example, to provide power to start the main engines, or de-ice wings). In this mode, the majority (or all) all air from the APS 16 is diverted to the APU 18 through the ECS bypass valve 24, the APU throttle valve 22 is closed, and the APU inlet pressure is increased significantly beyond ambient pressure, increasing the APU output power capability significantly.

While the ECS supply air from APS 16 may be at an adequate pressure for APU 18, the ECS supply air may have a relatively high temperature that results in a lower efficiency as compared to ECS supply air at a lower temperature. For example, uncooled pressurization air, which may have a temperature of over 300° F. for a vapor cycle ECS or over 400° F. for an air cycle ECS, may be mixed with cabin discharge air, which may have a relatively cool temperature of about 80° F., before being fed to an APU.

According to principles of the disclosure, ECS supply air may be taken from the ECS downstream of a heat exchanger. For example, an ECS may include a primary heat exchanger at an inlet of the ECS that reduces the temperature of the ECS supply air entering the ECS. The ECS may use ambient ram air as a heat sink for the heat exchanger, such that ECS supply air passing through the heat exchanger may be cooled before entering an ECS pack or APU supply line. By taking the ECS supply air for use as APU supply air from downstream of this heat exchanger, the system may provide the APU with APU supply air with reduced temperature and/or temperature variations, while having a low impact to the ECS pack of the ECS.

FIG. 2 is a diagram illustrating an example system for managing pressurized air supplies to an auxiliary power unit (APU) that includes one or more ECS bypass valves downstream of one or more heat exchangers. FIG. 2 may include a cabin 112, an ECS supply line 126, an ECS discharge line 128, an outflow discharge line 134, an outflow valve 120, a cabin discharge line 130, an APU throttle valve 122, an APU supply line 132, an APU outboard line 140, an outboard check valve 142, an APU 118, and a controller 136 that may be operably similar to cabin 12, ECS supply line 26, ECS discharge line 28, outflow discharge line 34, outflow valve 20, cabin discharge line 30, APU throttle valve 22, APU supply line 32, APU outboard line 40, outboard check valve 42, APU 18, and controller 36 of FIG. 1.

In the example of FIG. 2, system 110 includes one or more load compressors 116 configured to receive mechanical power from APU 118, such as through mechanical link 152, and pressurize environmental air using the mechanical power from APU 118. For example, as APU 118 operates, it produces mechanical power that may be used to power other components, including load compressor 116.

System 110 includes an ECS 114A and an ECS 114B (collectively referred to as "ECS 114"). ECS 114A may include an ECS pack 146, a heat exchanger (HEX) 144 upstream of ECS pack 146, a HEX outlet 148 coupling HEX 144 to ECS pack 146, and a temperature sensor 150 coupled to HEX outlet 148. While not shown, ECS 114B may include similar components. Each of ECS 114A and ECS 114B may have a respective ECS bypass valve 124A and 124B. As shown for ECS 114A, ECS bypass valve 124A is fluidically coupled to HEX outlet 148 downstream of HEX 144.

By using HEX 144 to provide cooler ECS supply air to ECS bypass valve 124A, HEX 144 may be larger than if ECS bypass valve 124A was not coupled to HEX outlet 148. However, other components of ECS pack 146, such as other heat exchangers and pack turbomachines, may be similarly sized as if ECS bypass valve 124 was not coupled to HEX outlet 148. As such, system 110 may provide sufficient APU supply air flow to APU 118 across an entire flight profile with reduced temperature. By utilizing load compressor 116 to supply ECS 114 with ECS supply air, the ECS 114 may be capable of operating without bleed air, electrical power, or hydraulic power from the main engines which may improve aircraft fuel efficiency and reliability.

Controller 136 may be operably similar to controller 36, such as being configured to control a pressure of cabin 112 by controlling at least one of outflow valve 120 and APU throttle valve 122 and control a flow rate of APU supply air to APU 118 by controlling at least one of APU throttle valve 122 and ECS bypass valves 124A and 124B. Additionally, controller 136 may be configured to perform other functions with respect to system 110.

In some examples, controller 136 may be configured to control ECS bypass valves 124A and 124B based on a temperature measurement downstream of HEX 144, such as from temperature sensor 150 (for ECS 114A). For example, controller 136 may receive a temperature measurement signal from temperature sensor 150 that represents a temperature of ECS supply air received by ECS pack 146 and compare the temperature measurement signal against a temperature setpoint for ECS pack 146. Based on this comparison between the temperature measurement and the temperature setpoint, controller 136 may determine a control signal for at least one of ECS bypass valve 124A and ECS bypass valve 124B. For example, controller 136 may continue to monitor the temperature measurement signal to ensure that flow from ECS bypass valve 124A does not overwhelm the heat rejection capability of ECS pack 146. If the temperature measurement signal exceeds the temperature setpoint, controller 136 may operate ECS bypass valve 124A to limit bypass flow and maintain HEX outlet temperatures within acceptable limits. Controller 136 may correspondingly operate APU throttle valve 122 to maintain pressure of cabin 112, which may result in an increase in an inlet temperature to APU 118 to maintain power capability. Additionally or alternatively, controller 136 may operate ECS bypass valve 124B to make up for any shortfall in bypass flow, while maintaining a temperature of ECS 114B within limits (if application).

In some examples, it may be advantageous to supply supplemental pressurized air to an APU from an APS without a direct mechanical linkage to the APU. For example, a vapor cycle ECS may only require pressurized air that is a few psi above cabin pressure. According to principles of the disclosure, a system may include a stand-alone air pressurization system, such as through one or more cabin air compressors, capable of operating from electrical, hydraulic, or pneumatic power with freedom to operate at optimum speeds independent of the speeds of the main engines and/or an APU.

FIG. 3 is a diagram illustrating an example system 210 for managing pressurized air supplies to an auxiliary power unit (APU) that includes one or more cabin air compressors to supply the APU with pressurized ECS supply air. FIG. 3 may include a cabin 212, an ECS supply line 226, an ECS discharge line 228, an outflow discharge line 234, an outflow valve 220, a cabin discharge line 230, an APU throttle valve 222, an APU supply line 232, an APU outboard line 240, an outboard check valve 242, an APU 218, and a controller 236 that may be operably similar to cabin 12, ECS supply line 26, ECS discharge line 28, outflow discharge line 34, outflow valve 20, cabin discharge line 30, APU throttle valve 22, APU supply line 32, APU outboard line 40, outboard check valve 42, APU 18, and controller 36 of FIG. 1.

System 210 includes one or more cabin air compressors (CACs) 216A and 216B (collectively referred to as "CACs 216") configured to receive environmental air and pressurize the environmental air using the electrical, hydraulic, or pneumatic power. For example, an air pressurization system that utilizes CACs may operate independent of a speed of APU 218 and/or operate from multiple power sources, such as an APU generator, a main engine generator, a ram air turbine emergency generator, batteries, and the like.

Controller 236 may be configured to operate CACs 216 to provide adequate ECS discharge air to cabin 212. Controller 236 may be configured to receive a flow measurement from an inlet to an ECS or an inlet to ECS pack and determine, based on the flow measurement and a flow setpoint of the ECS or ECS pack, a control signal to one or more CACs 216. For example, for a vapor cycle ECS, controller 236 may operate CACs 216 to provide ECS supply air at about 2-3 psi above a pressure of cabin 212 to provide adequate flow while overcome pressure losses in ducting and heat exchangers of ECS 214. For an air cycle ECS, controller 236 may operate CACs 216 to provide ECS supply air at about 10-20 psi above a pressure of cabin 212 to provide adequate flow, depending on ambient temperature and altitude. In the event of failure of APU 218, controller 236 may operate CACs 216 (and ECS 14 may operate ECS packs) using energy supplied by the main engine generators of the aircraft, which may improve continuity of operation of the aircraft.

As mentioned above, a system that utilizes a stand-alone air pressurization system may be capable of operating independent from the main engine or APU. According to principles of the disclosure, a system may be further configured with an air pressurization system that includes redundant pressurization components, such that the aircraft may continue to operate safely in the event a component of the air pressurization system fails.

FIG. 4 is a diagram illustrating an example system 310 for managing pressurized air supplies to an auxiliary power unit (APU) that includes redundant and independently operable pressurization components. FIG. 4 may include a cabin 312, an ECS supply line 326, an ECS discharge line 328, an outflow discharge line 334, an outflow valve 320, a cabin discharge line 330, an APU throttle valve 322, an APU supply line 332, an APU outboard line 340, an outboard check valve 342, an APU 318, and a controller 336 that may be operably similar to cabin 12, ECS supply line 26, ECS discharge line 28, outflow discharge line 34, outflow valve 20, cabin discharge line 30, APU throttle valve 22, APU supply line 32, APU outboard line 40, outboard check valve 42, APU 18, and controller 36 of FIG. 1, or other similar components of FIGS. 2 and 3.

As shown in FIG. 4, system 310 may include one or more environmental control systems, such as ECS 314A and ECS 314B. ECS 314A includes an ECS pack 346A, a heat exchanger (HEX) 344A, a HEX outlet 348A, and a temperature sensor 350A coupled to HEX outlet 348A; similarly, ECS 314B includes an ECS pack 346B, a heat exchanger (HEX) 344B, a HEX outlet 348B, and a temperature sensor 350B coupled to HEX outlet 348B. HEX 344A may be supplied with ECS supply air generated by a first set of compressors that includes two CACs 316A and 316B, while HEX 344B may be supplied with ECS supply air generated by a second set of compressors that includes two CACs 316C and 316D. ECS 314A may be coupled to APU supply line 332 through ECS bypass valve 324A, while ECS 314B may be coupled to APU supply line 332 through ECS bypass valve 324B.

Controller 336 may be configured to operate CACs 316 and/or ECS bypass valves 324 in such a way that, if desired, a cooling function and an APS supply air function of system 310 may be compartmentalized. Controller 336 may receive an indication of failure of CAC 316A. Based on the indication of failure, controller 336 may determine a first control signal for ECS bypass valve 324A and a second control signal for ECS bypass valve 324B. For example, in the event of a failure of one of CACs 316, such as CAC 316A, controller 336 may reduce flow of ECS supply air on the side with the failure (e.g., the "A" side) to allow the remaining CAC 316 on the side (e.g., CAC 316B) to operate within its design capability. Optionally, a corresponding ECS 314 on the failed side (e.g., ECS 314A) may turn off a corresponding ECS pack 346 (e.g., ECS pack 346A), such that the remaining CAC 316 (e.g., CAC 316B) may provide ECS supply air to APU 318 through a corresponding ECS bypass valve 324 (e.g., ECS bypass valve 324A). Controller 336 may control the ECS bypass valve 324 on the side (e.g., 324B) having an operational ECS 314 (e.g., ECS 314B) to fully closed, maximizing the cooling capability of the operational side (e.g., the "B" side).

Controller 336 may be configured to operate a similar strategy with respect to failure of an ECS pack 346, such as ECS pack 346A. During moderate conditions and power demands, controller 336 may power off CACs (e.g., CACs 316A and 316B) on the side with the failed VCS pack, and all pressurization and bypass air provided by CACs on the operational side (e.g., CACs 316C and 316D). If flow demand exceeds the capability of those CACs, controller 336 may start up one or both of the CACs on the side of the failed VCS pack (e.g., CACs 316A and/or 316B) to take over the job of providing ECS supply air to APS 316 and unburden the CACs on the side of the operational VCS pack (e.g., CACs 316C and 316D).

Figure 5:
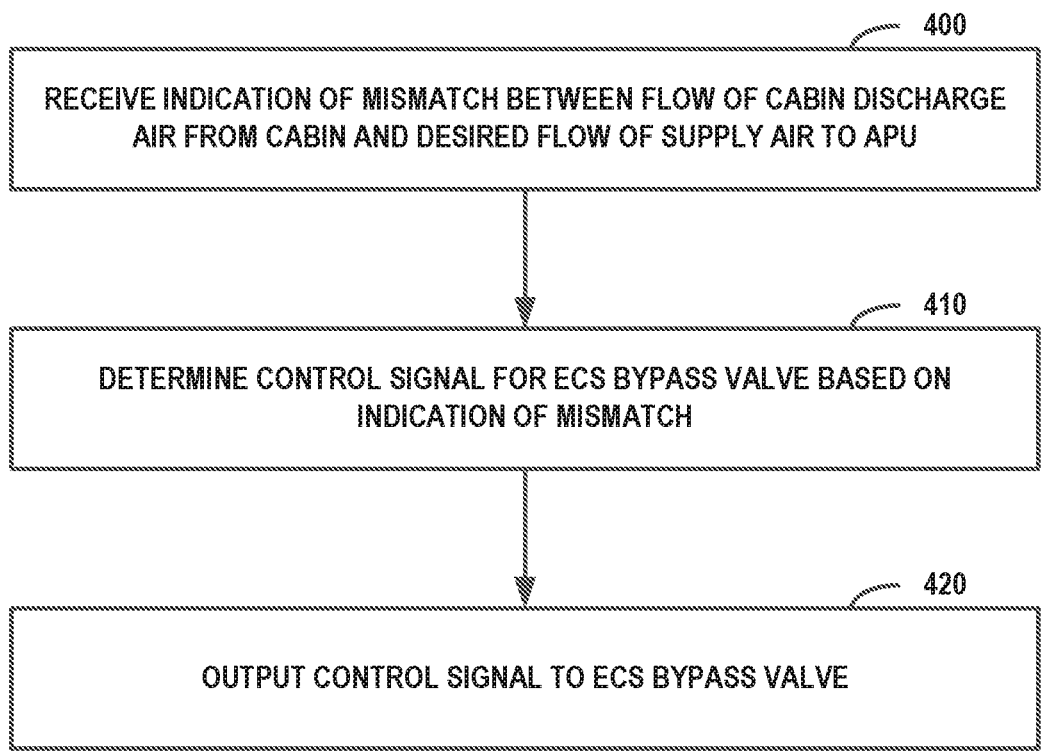
FIG. 5 is a flowchart of an example technique for supplying APU supply air to an APU.

FIG. 5 is a flowchart of an example technique for supplying APU supply air to an APU. While FIG. 5 will be described with reference to controller 36 of FIG. 1, other systems may be used to implement the techniques of FIG. 5. Controller 36 may receive an indication of a mismatch between a flow of cabin discharge air from cabin 12 to APU 18 and a desired flow of supply air to APU 18 (400). The indication of the mismatch may represent an amount of ECS supply are that may be supplied to APU 18 to supplement the cabin discharge air from cabin 12. In some examples, the indication of the mismatch includes a valve position or change in valve position of outflow valve 20 (e.g. fully closed) and/or APU throttle valve 22. For example, controller 36 may receive a valve position of outflow valve 20 (e.g., fully closed) and/or a change in valve position of APU throttle valve 22 (e.g. not fully open or modulating). In some examples, the indication of the mismatch includes a measured indication of a difference in flow between the flow of cabin discharge air and a flow setpoint for APU 18. For example, controller 36 may receive a flow measurement representing flow of cabin discharge air from cabin 12 to APU 18, receive a flow setpoint representing a predetermined flow of supply air to the APU for a given power level, and determine a difference between the flow measurement and the flow setpoint.

Controller 36 may determine, based on the indication of the mismatch, a control signal for ECS bypass valve 24 (410). ECS bypass valve 24 is configured to control flow of pressurized ECS supply air from APS 16 and/or ECS 14 to APU 18. Controller 36 may output the control signal to ECS bypass valve 24 (420), such as to increase or decrease a flow of ECS supply air to APU 18.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Figure 6:
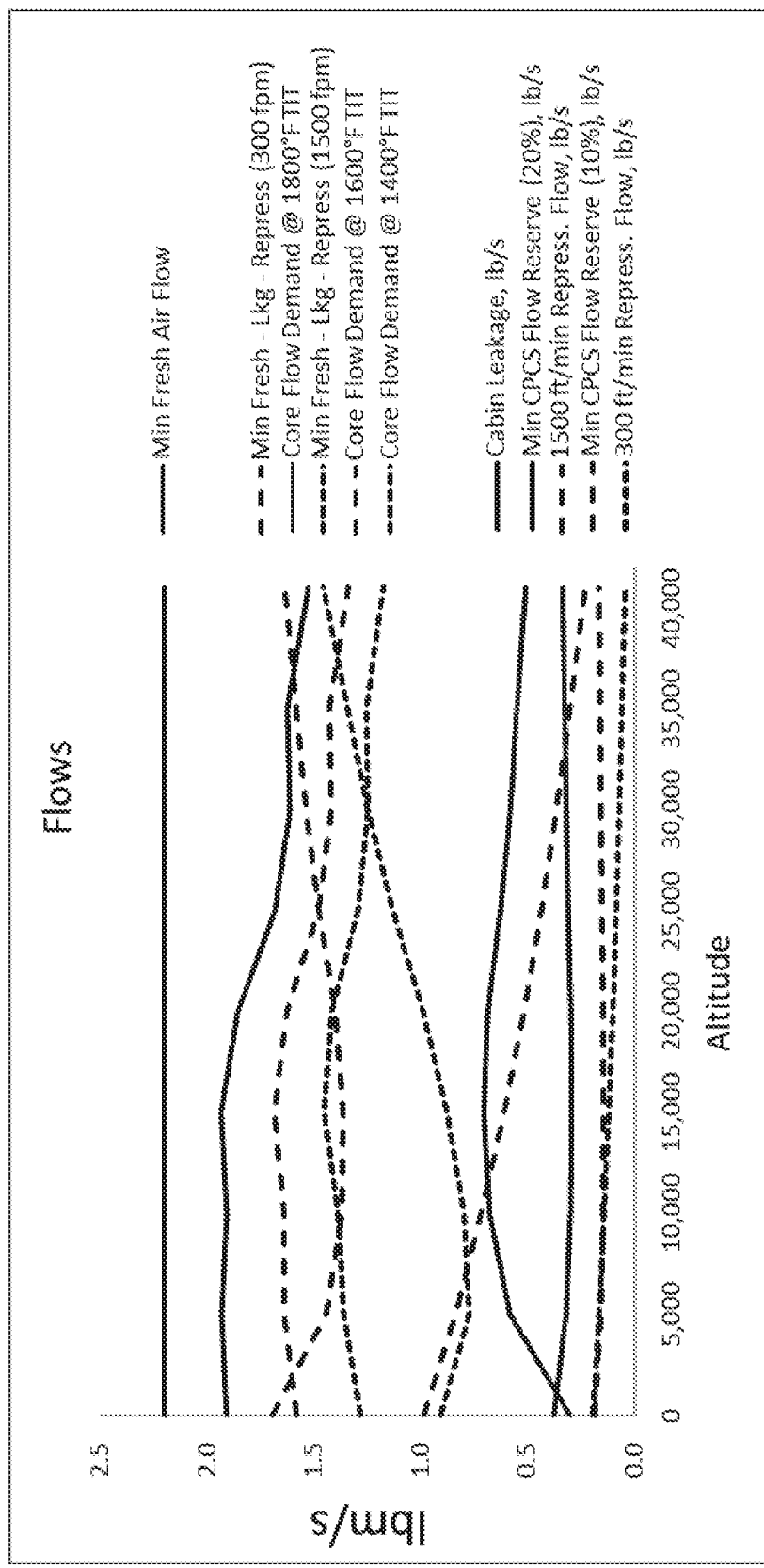
FIG. 6 is an example graph of various air flows of an aircraft at various altitudes.

FIG. 6 is an example graph of various air flows of an aircraft at various altitudes. For example, "fresh air flow" may correspond to ECS discharge air, "core flow demand" may correspond to APU supply air, "repress" may correspond to repressurization air, and "CPCS flow reserve" may correspond to cabin pressure control system discharge, such as from one or more outflow valves, as described herein.

The following numbered examples demonstrate one or more aspects of the disclosure.

Example 1: A system includes an auxiliary power unit (APU), an APU throttle valve, and an ECS bypass valve. The APU is configured to receive cabin discharge air from an aircraft cabin and receive environmental control system (ECS) supply air from an air pressurization system (APS). The APU throttle valve is configured to control flow of cabin discharge air from the cabin to the APU. The ECS bypass valve configured to control flow of ECS supply air from the APS to the APU.

Example 2: The system of Example 1, further including an outflow valve configured to control flow of cabin discharge air from the cabin to an environment.

Example 3: The system of Examples 1-2 or any combination thereof, further including an ECS configured to receive ECS supply air from the APS, generate ECS discharge air from the ECS supply air, and output the ECS discharge air to the cabin.

Example 4: The system of Example 3, in which the ECS includes a vapor cycle cooling system.

Example 5: The system of Examples 3-4 or any combination thereof, in which the ECS includes a primary heat exchanger at an inlet of the ECS, and in which the ECS bypass valve is fluidically coupled to an outlet of the primary heat exchanger.

Example 6: The system of Example 5, in which the ECS is a first ECS, the ECS bypass valve is a first ECS bypass valve, and the primary heat exchanger is a first primary heat exchanger, and in which the system further includes a second ECS and a second ECS bypass valve. The second ECS is configured to receive ECS supply air from the APS and includes a second primary heat exchanger at an inlet of the second ECS. The second ECS bypass valve is configured to control flow of ECS supply air from the APS to the APU and is fluidically coupled to an outlet of the second primary heat exchanger.

Example 7: The system of Examples 1-6 or any combination thereof, further including the APS configured to receive environmental air, generate ECS supply air from the environmental air, and output ECS supply air to an ECS and the APU.

Example 8: The system of Example 7, in which the APS comprises one or more compressors are configured to generate ECS supply air by pressurizing the environmental air.

Example 9: The system of Example 8, in which the one or more compressors include APU load compressors configured to receive mechanical power from the APU and pressurize the environmental air using the mechanical power from the APU.

Example 10: The system of Example 8, in which the one or more compressors includes cabin air compressors (CACs) configured to receive electrical power and pressurize the environmental air using the electrical power.

Example 11: The system of Example 8, in which the ECS is a first ECS, the ECS bypass valve is a first ECS bypass valve, and the APS is configured to output ECS supply air to the first ECS and a second ECS, and in which the system includes a second ECS bypass valve configured to control flow of ECS supply air from the APS to the APU, and in which the one or more compressors include a first set of at least two compressors configured to generate ECS supply air for the first ECS and a second set of at least two compressors configured to generate ECS supply air for the second ECS.

Example 12: The system of Examples 2-11 or any combination thereof, further includes a controller configured to control a pressure of the cabin using at least one of the APU throttle valve and the outflow valve, and control a flow of air to the APU using at least one of the APU throttle valve and the ECS bypass valve.

Example 13: The system of Example 12, in which the controller is further configured to control a flow rate of the ECS bypass valve based at least on a flow rate of the APU throttle valve.

Example 14: The system of Examples 12-13 or any combination thereof, in which the controller is further configured to control a temperature of ECS supply air to an ECS pack of an ECS using the ECS bypass valve.

Example 15: A method by a controller that includes receiving a valve position measurement from at least one of an outflow valve or an auxiliary power unit (APU) throttle valve, in which the outflow valve is configured to control flow of cabin discharge air from a cabin to an environment, and in which the APU throttle valve is configured to control flow of cabin discharge air from the cabin to an APU. The method further includes receiving at least one of an outflow valve setpoint or an APU throttle valve setpoint, in which the outflow valve setpoint represents a predetermined flow of cabin discharge air, and in which the APU throttle valve setpoint represents a predetermined flow of cabin discharge air from the cabin to the APU. The method further includes determining a difference between the valve position measurement and the corresponding valve setpoint and determining, based on the difference between the valve position measurement and the corresponding valve setpoint, a control signal for at least one environmental control system (ECS) bypass valve, in which the at least one ECS bypass valve is configured to control flow of ECS supply air from an air pressurization system (APS) to the APU. The method further includes outputting the control signal to the at least one ECS bypass valve.

Example 16: The method of Example 15, further including receiving a flow measurement for cabin discharge air from an aircraft cabin to an auxiliary power unit (APU) and receiving a flow setpoint for the APU, in which the flow setpoint represents a predetermined flow of supply air to the APU for a given power level. The method further includes determining a difference between the flow measurement and the flow setpoint and determining, based on the difference between the flow measurement and the flow setpoint, a control signal for at least one environmental control system (ECS) bypass valve, in which the at least one ECS bypass valve is configured to control flow of ECS supply air from an air pressurization system (APS) to the APU. The method further includes outputting the control signal to the at least one ECS bypass valve.

Example 17: The method of Examples 15-16 or any combination thereof, further including receiving a temperature measurement from an outlet of a primary heat exchanger of an ECS, in which the at least one ECS bypass valve is fluidically coupled to the outlet of the primary heat exchanger. The method further includes determining, further based on the temperature measurement and a temperature setpoint of an ECS pack downstream of the primary heat exchanger, the control signal for the at least one ECS bypass valve.

Example 18: The method of Example 17, in which the ECS pack is a vapor cycle pack and the APS includes one or more cabin air compressors (CACs), and in which the method further includes receiving a flow measurement from the outlet of the primary heat exchanger and determining, based on the flow measurement from the outlet of the primary heat exchanger and a flow setpoint of the vapor cycle pack, a control signal to the one or more CACs.

Example 19: The method of Example 15-18 or any combination thereof, in which the at least one ECS bypass valve includes a first ECS bypass valve and a second bypass valve, the APS includes a first set of compressors configured to generate ECS supply air for a first ECS and a second set of compressors configured to generate ECS supply air for a second ECS, and in which the method further includes receiving an indication of failure of at least one compressor of the first set of compressors, determining, based on the indication of failure of the at least one compressor, a first control signal for the first ECS bypass valve, and determining, based on the indication of failure of the at least one compressor, a second control signal for the second ECS bypass valve.

Example 20: The method of Example 19, in which the first control signal is configured to open the first ECS bypass valve, and in which the second control signal is configured to shut the second ECS bypass valve.

Various examples have been described. These and other examples are within the scope of the following claims.

What is claimed is:

1. A system, comprising:
   an air pressurization system (APS) configured to generate environmental control system supply air (ECS supply air) from environmental air;
   an ECS configured to:
     receive the ECS supply air from the APS;
     generate ECS discharge air from a first portion of the ECS supply air; and
     output the ECS discharge air to an aircraft cabin;
   an auxiliary power unit (APU) configured to:
     receive cabin discharge air from the aircraft cabin; and
     receive a second portion of the ECS supply air from the APS to supplement the cabin discharge air;
   an APU throttle valve configured to control flow of cabin discharge air from the cabin to the APU; and
   an ECS bypass valve configured to control a flow of the second portion of the ECS supply air from the APS to the APU and reduce a pressure of the second portion of the ECS supply air.

2. The system of claim 1, further comprising an outflow valve configured to control flow of cabin discharge air from the cabin to an external environment of an aircraft.

3. The system of claim 1, wherein the ECS comprises a vapor cycle cooling system.

4. The system of claim 1,
   wherein the ECS comprises a primary heat exchanger at an inlet of the ECS, and
   wherein the ECS bypass valve is fluidically coupled to an outlet of the primary heat exchanger.

5. The system of claim 4,
   wherein the ECS is a first ECS,
   wherein the ECS bypass valve is a first ECS bypass valve,
   wherein the primary heat exchanger is a first primary heat exchanger, and
   wherein the system further comprises:
     a second ECS configured to receive ECS supply air from the APS, where the second ECS comprises a second primary heat exchanger at an inlet of the second ECS; and
     a second ECS bypass valve configured to control flow of ECS supply air from the APS to the APU, wherein the second ECS bypass valve is fluidically coupled to an outlet of the second primary heat exchanger.

6. The system of claim 1, wherein the APS comprises one or more compressors configured to generate ECS supply air by pressurizing the environmental air.

7. The system of claim 6, wherein the one or more compressors comprise APU load compressors configured to:
receive mechanical power from the APU; and
pressurize the environmental air using the mechanical power from the APU.

8. The system of claim 6, wherein the one or more compressors comprise cabin air compressors (CACs) configured to:
receive electrical power; and
pressurize the environmental air using the electrical power.

9. The system of claim 6,
wherein the ECS is a first ECS,
wherein the ECS bypass valve is a first ECS bypass valve,
wherein the APS is configured to output ECS supply air to the first ECS and a second ECS,
wherein the system comprises a second ECS bypass valve configured to control flow of ECS supply air from the APS to the APU, and
wherein the one or more compressors comprise:
a first set of at least two compressors configured to generate ECS supply air for the first ECS; and
a second set of at least two compressors configured to generate ECS supply air for the second ECS.

10. The system of claim 2, further comprising a controller configured to:
control a pressure of the cabin using at least one of the APU throttle valve and the outflow valve; and
control a flow of air to the APU using at least one of the APU throttle valve and the ECS bypass valve.

11. The system of claim 10, wherein the controller is further configured to control a flow rate of the ECS bypass valve based at least on a flow rate of the APU throttle valve.

12. The system of claim 10, wherein the controller is further configured to control a temperature of ECS supply air to an ECS pack of an ECS using the ECS bypass valve.

13. A method, comprising:
receiving, by a controller, a valve position measurement from at least one of an outflow valve or an auxiliary power unit throttle valve (APU throttle valve), wherein the outflow valve is configured to control flow of cabin discharge air from a cabin to an external environment of an aircraft, and wherein the APU throttle valve is configured to control flow of cabin discharge air from the cabin to an auxiliary power unit (APU);
receiving, by the controller, at least one of an outflow valve setpoint or an APU throttle valve setpoint, wherein the outflow valve setpoint represents a predetermined flow of cabin discharge air, and wherein the APU throttle valve setpoint represents a predetermined flow of cabin discharge air from the cabin to the APU;
determining, by the controller, a difference between the valve position measurement and the corresponding valve setpoint;
determining, by the controller and based on the difference between the valve position measurement and the corresponding valve setpoint, a control signal for at least one environmental control system bypass valve (ECS bypass valve), wherein the at least one ECS bypass valve is configured to control flow of ECS supply air from an air pressurization system (APS) to the APU; and
outputting, by the controller, the control signal to the at least one ECS bypass valve.

14. The method of claim 13, further comprising:
receiving, by the controller, a flow measurement for cabin discharge air from the cabin to the APU;
receiving, by the controller, a flow setpoint for the APU, wherein the flow setpoint represents a predetermined flow of supply air to the APU for a given power level;
determining, by the controller, a difference between the flow measurement and the flow setpoint;
determining, by the controller and based on the difference between the flow measurement and the flow setpoint, a control signal for the at least one ECS bypass valve, wherein the at least one ECS bypass valve is configured to control flow of ECS supply air from the APS to the APU; and
outputting, by the controller, the control signal to the at least one ECS bypass valve.

15. The method of claim 13, further comprising:
receiving, by the controller, a temperature measurement from an outlet of a primary heat exchanger of an ECS, wherein the at least one ECS bypass valve is fluidically coupled to the outlet of the primary heat exchanger; and
determining, by the controller and further based on the temperature measurement and a temperature setpoint of an ECS pack downstream of the primary heat exchanger, the control signal for the at least one ECS bypass valve.

16. The method of claim 15,
wherein the ECS pack is a vapor cycle pack,
wherein the APS comprises one or more cabin air compressors (CACs), and
wherein the method further comprises:
receiving, by the controller, a flow measurement from the outlet of the primary heat exchanger; and
determining, by the controller and based on the flow measurement from the outlet of the primary heat exchanger and a flow setpoint of the vapor cycle pack, a control signal to the one or more CACs.

17. The method of claim 13,
wherein the at least one ECS bypass valve comprises a first ECS bypass valve and a second bypass valve,
wherein the APS comprises:
a first set of compressors configured to generate ECS supply air for the first ECS; and
a second set of compressors configured to generate ECS supply air for the second ECS, and
wherein the method further comprises:
receiving, by the controller, an indication of failure of at least one compressor of the first set of compressors; and
determining, by the controller and based on the indication of failure of the at least one compressor, a first control signal for the first ECS bypass valve; and
determining, by the controller and based on the indication of failure of the at least one compressor, a second control signal for the second ECS bypass valve.

18. The method of claim 17,
wherein the first control signal is configured to open the first ECS bypass valve, and
wherein the second control signal is configured to shut the second ECS bypass valve.

19. The method of claim 13, wherein the flow of ECS supply air from the APS to the APU is a second portion of the ECS supply air, and further comprising:

providing, using the APS, a first portion of the ECS supply air to an environmental control system (ECS) configured to provide discharge air to the cabin.

20. The method of claim 19, further comprising:

receiving, by the APU, and through the APU throttle valve, the flow of cabin discharge air from the cabin to the APU; and receiving, by the APU, and through the ECS bypass valve, the first portion of the ECS supply air.

* * * * *